United States Patent Office 3,803,250
Patented Apr. 9, 1974

3,803,250
MAGNESIUM COMPLEXES OF POLYHYDROXY
COMPOUNDS AND THEIR PREPARATION
Ludwig A. Hartmann, Wilmington, Del., assignor to
ICI America Inc., Wilmington, Del.
No Drawing. Filed Apr. 24, 1970, Ser. No. 31,751
Int. Cl. C07c 31/30; A61k 27/00
U.S. Cl. 260—635 K
12 Claims

ABSTRACT OF THE DISCLOSURE

Magnesium complexes of polyhydroxy compounds are prepared by reacting a magnesium alkoxide with a polyhydroxy compound such as sorbitol in the presence of water. The complexes preferably have a ratio of about 0.1 to about 0.7 gram atoms of magnesium to each hydroxyl group of the polyhydroxy compound.

---

This invention relates to magnesium complexes of polyhydroxy compounds and to their preparation by reacting a magnesium alkoxide with a polyhydroxy compound in the presence of water. These complexes are useful as antacids and may be used in the same manner as magnesium hydroxide. They are also useful as catalysts in organic reactions where a basic catalyst is used such as in isomerizations, for example, the isomerization of glucose and fructose.

My related applications of the same filing date titled "Method of Preparing Aluminum Complexes of Polyhydroxy Compounds" and "Magnesium-Aluminum Complexes of Polyhydroxy Compounds and Their Preparation," Ser. Nos. 31,749 and 31,750, respectively, and now U.S. Pat. Nos. 3,686,249 and 3,631,083, respectively, may be referred to for additional information in this area.

STARTING MATERIALS

Magnesium alkoxides are well known and may be prepared, for example, by reacting magnesium with a monohydric alcohol. The preferred magnesium alkoxides, which are easily obtained, have the formula $Mg(OR)_2$ where R is alkyl up to $C_4$; magnesium ethoxide is preferred because it is readily available. Mixtures of magnesium alkoxides are also contemplated.

The polyhydroxy compound is an organic compound having at least two hydroxyl groups. The preferred polyhydroxy compounds, which are more easily obtained, have from 3 to 6 carbon atoms and are linear or branched, preferably linear, and preferably have 2 to 6 hydroxyl groups which may be vicinal or in a 1,3-relationship to each other. Suitable polyhydroxy compounds include propylene glycol, 1,2-, 1,3-, and 2,3-butylene glycols, 1,2-, 1,3-, 2,3-, and 2,4-pentylene glycols, 1,2-, 1,3-, 2,3-, and 2,4-hexylene glycols, glycerol, butanetriols, pentanetriols, hexanetriols, erythritol, pentanetetrols, hexanetetrols, xylitol, hexanepentols, sorbitol, mannitol, and dulcitol; sorbitol is preferred as it is readily available. Also contemplated are mixtures of polyhydroxy compounds and polymers of polyhydroxy compounds such as hydroxyl bearing polyethers, e.g., diglycerol, polyglycerols, etc.

THE COMPLEX

The complexes preferably have a ratio of about 0.1 to about 0.7 gram atoms of magnesium to each hydroxyl group of the polyhydroxy compound. Ratios outside of this range may result in large amounts of unreacted ingredients, polymeric structures, or the dilution of the magnesium to a level where the complex becomes less effective.

The exact structure of the complex produced is not known. However, it is believed that the product is a mixture of compounds of the following type:

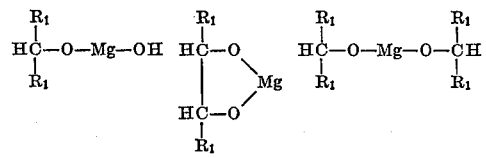

where each $R_1$ is appropriately selected from hydrogen, alkyl, or hydroxyl substituted alkyl so that the above compounds result from the reaction of a polyhydroxy compound.

THE REACTION

The reaction of the magnesium alkoxide and the polyhydroxy compounds should be carried out in the presence of water. This amount of water, in moles per gram atom of magnesium, is equal to about 6 to about 18 (preferably about 12) times the number of gram atoms of magnesium charged divided by the number of hydroxyl equivalents of polyhydroxy compound charged. The use of excess water results in the formation of magnesium hydroxide accompanied by a considerable amount of unreacted polyhydroxy compound, while the use of insufficient water results in an incomplete reaction of the magnesium alkoxide. The amount of water, in moles per gram atom of magnesium, is preferably equal to about 6 to about 12 times the number of gram atoms of magnesium charged divided by the number of hydroxyl equivalents of polyhydroxy compound charged when the ratio of gram atoms of magnesium to each hydroxyl group of the polyhydroxy compound is about 0.1 to about 0.4 and is about 12 to about 18 times the number of gram atoms of magnesium charged divided by the number of hydroxyl equivalents of polyhydroxy compound charged when the above ratio is about 0.4 to about 0.7; this is preferred because the hydroxyl groups on the polyhydroxy compound tend to reduce the need for water.

As the reaction proceeds and the reaction mixture thickens, enough water-miscible solvent may be added to dilute the mixture so that it may be easily stirred. Dioxane, methyl Cellosolve (ethylene glycol monomethyl ether), alcohols such as methanol, ethanol, propanol, or isopropanol, etc., are examples of suitable solvents; alcohols are preferred, as they are inexpesive, easily distilled, and the polyhydroxy compounds are very soluble in them. The temperature of the reaction is not critical, but about 70° C. is preferred.

After the alkoxide and the polyhydroxy compound have reacted to form the complex, the complex is dried. This is preferably done by vacuum treating under slightly reduced pressure at about 55 to about 90° C.

While the drying step removes the excess alcohol, it does not remove the alcohol which is attached to the complex in the form of unreacted alkoxide. This alcohol is stripped from the complex by vacuum distilling under less than 1 millimeter of mercury with thorough agitation and heating, preferably to about 55° C. to about 90° C. (below 55° C. too much time is required to make the process practical and above 90° C. the complex tends to decompose).

The following examples further illustrate this invention; Example I being the preferred example:

Example I

A two-liter flask equipped with a thermometer, reflux condenser, and an air-driven stirrer was charged with 14.6 g. of magnesium turnings, 950 ml. absolute ethanol, and 2 ml. carbon tetrachloride. The mixture was stirred and warmed on the steam bath and allowed to react at 78° C. for 24 hours. After 19 hours 20 ml. of xylene was added to help complete the reaction. When all the magnesium had reacted to form magnesium ethoxide, a solution of 54.6 g. of sorbitol and 32.6 ml. of water was added at 65° C. and the thin slurry was mixed well for ten minutes. Drying was then carried out at 60° C. and 200 mm. for 30 minutes at 60° C. and 20–40 mm. for 1½ hours and the granular product was then held at 60 to 70° C. and 0.4 mm. for 16 hours. The product was ground and passed through a 60 mesh screen before final stripping at 70° C. and 0.3 mm. for one day and 115 to 120° C. at 0.3 mm. for 16 hours. The final yield was 73.8 g. Analysis showed carbon, 28.3%; hydrogen, 5.13%; ash, 30.67%; ethanol, 0.009%; 99.9% alkoxide reacted; and free sorbitol, 2.7%. The approximate molar ratio of sorbitol to magnsium to inorganic hydroxyl groups was 1:2:1 in the complex (those hydroxyl groups attached to the magnesium and titratable with acid are referred to herein as "inorganic").

Example II

Using the same procedure that was used in Example I, a flask was charged with 14.6 g. magnesium turnings and 750 ml. methyl alcohol containing 1 ml. $CCl_4$. The reaction proceeded at 65° C. for 40 minutes to produce magnesium methoxide; additional methanol (750 ml.) was added during the reaction as a diluent. Then 109.3 g. of sorbitol was added followed by 17 ml. of water in 50 ml. methanol. The reaction was allowed to proceed at 65° C. for one hour. Vacuum drying and stripping was carried out at 50 to 70° C. and 200 mm. down to 50 mm. for 6½ hours, 70 to 80° C. and 20 down to 3 mm. for 6 hours and 115 to 120° C. at less than 1 mm. for 24 hours. 121.2 g. of product were obtained. Analysis showed 12.05% magnesium, 34.97% carbon, 5.75% hydrogen, 20.4% ash, and 0.5% alcohol. The molar ratio of sorbitol to magnesium in the product was 1 to 1.

Example III

Using the same procedure that was used in Example I, a flask was charged with 14.6 g. magnesium, 150 ml. ethanol, 30 ml. xylene, and 1 ml. $CCl_4$. The reaction proceeded at 80° C. for 6 hours to produce magnesium ethoxide. Additional ethanol (750 ml.) was added followed by 36.4 g. sorbitol in 53.6 ml. water; the reaction proceeded at 70° C. for 1½ hours. The product was then vacuum dried and stripped at 50 to 70° C. and 200 down to 50 mm. for 8 hours, 70 to 80° C. and 20 down to 3 mm. for 26 hours and 115 to 120° C. at less than 1 mm. for 7 hours. Analysis showed 22.9% magnesium, 24.57% carbon, 4.89% hydrogen, 30.3% ash, 0.09% alcohol, and 0.2% free sorbitol. The approximate molar ratio of sorbitol to magnesium to inorganic hydroxyl groups was 1:3:1.

Example IV

A flask equipped with thermometer, reflux condenser, and stirrer is charged with 14.6 g. magnesium turnings, 950 ml. absolute isopropyl alcohol, 20 ml. xylene and 2 ml. $CCl_4$. The mixture is treated on the steam bath under reflux until magnesium isopropoxide is produced. Aqueous erythritol (73 g. erythritol and 32 g. water) is then added at about 65° C. and the resultant slurry mixed well at that temperature. Vacuum drying is carried out initially at 60–70° C. with the aid of a slight vacuum for several hours. Stripping is carried out at 100–110° C. and high vacuum for several hours. The product is a light-colored solid and has a molar ratio of erythritol to magnesium of 1 to 1.

Example V

A flask equipped with thermometer, reflux condenser, and stirrer is charged with 14.6 g. magnesium turnings, 950 ml. absolute ethanol, 20 ml. xylene, and 2 ml. $CCl_4$. The mixture is treated on the steam bath under reflux until magnesium ethoxide is produced. Aqueous propylene glycol (45.6 propylene glycol and 75 g. water) is then added at about 65° C. and the resultant slurry mixed well at that temperature. Vacuum drying is carried out initially at 60–70° C. with the aid of slight vacuum for several hours. Stripping is carried out at 100–110° C. and high vacuum for several hours. The product has a molar ratio of propylene glycol to magnesium of 1 to 1.

What is claimed is:

1. A magnesium derivative of a polyhydroxy compound having a ratio of about 0.1 to about 0.7 gram atoms of magnesium to each hydroxyl group of polyhydroxy compound consisting essentially of the product formed by (a) reacting magnesium alkoxide with a polyhydroxy compound selected from the group consisting of erythritol, hexanetetrols, hexanepentols, xylitol, sorbitol, mannitol, and dulcitol in the presence of an amount of water, in moles per gram atom of magnesium, equal to about 6 to about 18 times the number of gram atoms of magnesium charged divided by the number of hydroxyl equivalents of polyhydroxy compound charged; (b) drying the product formed in step (a); and then (c) vacuum stripping with heating the product of step (b) at a final vacuum of less than one millimeter of mercury with thorough agitation.

2. A derivative according to claim 1 wherein the magnesium alkoxide reactant has the formula $Mg(OR)_2$ where R is alkyl to $C_4$.

3. The magnesium derivative of claim 1 wherein the amount of water, in moles per gram atom of magnesium, is equal to about 12 times the number of gram atoms of magnesium charged divided by the number of hydroxyl equivalents of polyhydroxy compound charged.

4. The magnesium drivative of claim 1 wherein the amount of water, in moles per gram atom of magnesium, is equal to about 6 to about 12 times the number of gram atoms of magnesium charged divided by the number of hydroxyl equivalents of polyhydroxy compound charged when the ratio of gram atoms of magnesium to each hydroxyl group of polyhydroxy compound is about 0.1 to about 0.4 and the amount of water, in moles per gram atom of magnesium, is equal to about 12 to about 18 times the number of gram atoms of magnesium charged divided by the number of hydroxyl equivalents of polyhydroxy compound charged when the ratio of gram atoms of magnesium to each hydroxyl group of polyhydroxy compound is about 0.4 to about 0.7.

5. The magnesium derivative of claim 1 wherein said polyhydroxy compound is sorbitol.

6. The magnesium derivative of claim 1 wherein said magnesium alkoxide is magnesium ethoxide.

7. A process of producing a magnesium derivative of a polyhydroxy compound having a ratio of about 0.1 to about 0.7 gram atoms of magnesium to each hydroxyl group of polyhydroxy compound consisting essentially of reacting (a) a magnesium alkoxide having the formula $Mg(OR)_2$ with a polyhydroxy compound selected from the group consisting of alkane polyols having from 3 to 6 carbon atoms and 2 to 6 hydroxyl groups and diglycerol, said reaction taking place in the presence of an amount of water, in moles per gram atom of magnesium, equal to about 6 to about 18 times the number of gram atoms of magnesium charged divided by the number of hydroxyl equivalents of polyhydroxy compound charged, where R is alkyl to $C_4$; (b) drying the product formed in step (a); and then (c) vacuum stripping with heating the product of step (b) at a final vacuum of less than one millimeter of mercury wth thorough agitation.

8. The process of claim 7 wherein the amount of water is, in moles per gram atom of magnesium, equal to about 12 times the number of gram atoms of magnesium charged divided by the number of hydroxyl equivalents of polyhydroxy compound charged.

9. The process of claim 7 wherein said polyhydroxy compound is sorbitol.

10. The process of claim 7 wherein said magnesium alkoxide is magnesium ethoxide.

11. The process of claim 7 wherein the vacuum stripping is carried out at about 55° to about 90° C.

12. The process of claim 7 wherein a water-miscible solvent selected from the group consisting of dioxane, ethylene glycol monomethyl ether, methanol, ethanol, propanol and isopropanol is present during the reaction.

References Cited

UNITED STATES PATENTS

| | | | |
|---|---|---|---|
| 2,755,220 | 7/1956 | Alford et al. | 23—201 |
| 2,510,550 | 6/1950 | Byrns | 260—632 A |
| 1,712,830 | 5/1929 | Kyrides | 260—632 A |

OTHER REFERENCES

Turova et al., "Russian Chemical Reviews," vol. 34 (1965), pp. 161–185, pp. 161–165 and 169 supplied.

LEON ZITVER, Primary Examiner

J. E. EVANS, Assistant Examiner

U.S. Cl. X.R.

260—615 R, 632 A; 424—343